United States Patent [19]
Nice

[11] Patent Number: 4,897,100
[45] Date of Patent: Jan. 30, 1990

[54] APPARATUS AND PROCESS FOR FIBERIZING FLUORIDE GLASSES USING A DOUBLE CRUCIBLE AND THE COMPOSITIONS PRODUCED THEREBY

[75] Inventor: Minor L. Nice, Newark, Ohio

[73] Assignee: Owens-Corning Fiberglas Corporation, Toledo, Ohio

[21] Appl. No.: 296,564

[22] Filed: Jan. 13, 1989

[51] Int. Cl.⁴ .......................................... C03B 37/023
[52] U.S. Cl. ........................................ 65/3.13; 65/3.2; 65/11.1; 65/121; 65/DIG. 16
[58] Field of Search ..................... 65/3.13, 3.2, 11.1, 65/66, 83, 121, DIG. 16

[56] References Cited
U.S. PATENT DOCUMENTS
4,729,777  3/1988  Mimura et al. ............... 65/DIG. 16

FOREIGN PATENT DOCUMENTS
0067489  12/1982  European Pat. Off. ............ 65/3.13

Primary Examiner—Arthur Kellogg
Attorney, Agent, or Firm—Patrick P. Pacella; Catherine B. Martineau

[57] ABSTRACT

A double crucible fiberizing apparatus and process for producing a continuous glass filament having a core fluoride-containing glass concentrically surrounded by a clad fluoride-containing glass at increased throughput speeds while simultaneously achieving increased length and uniform filament diameter are disclosed.

20 Claims, 3 Drawing Sheets

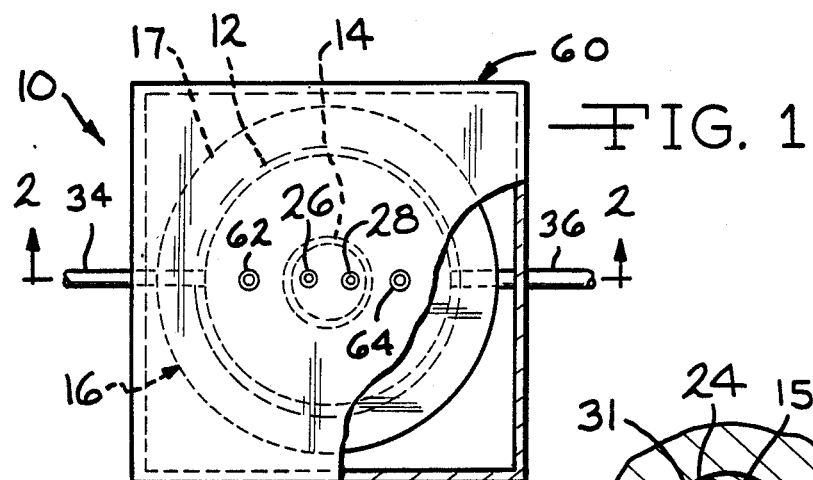
FIG. 1
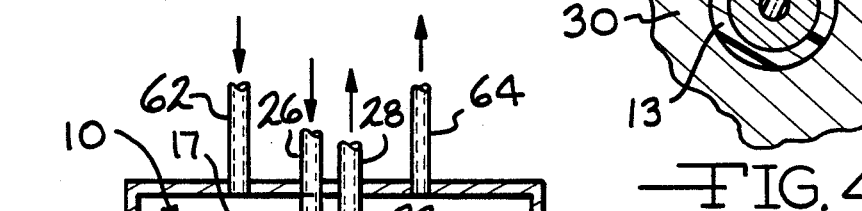
FIG. 4
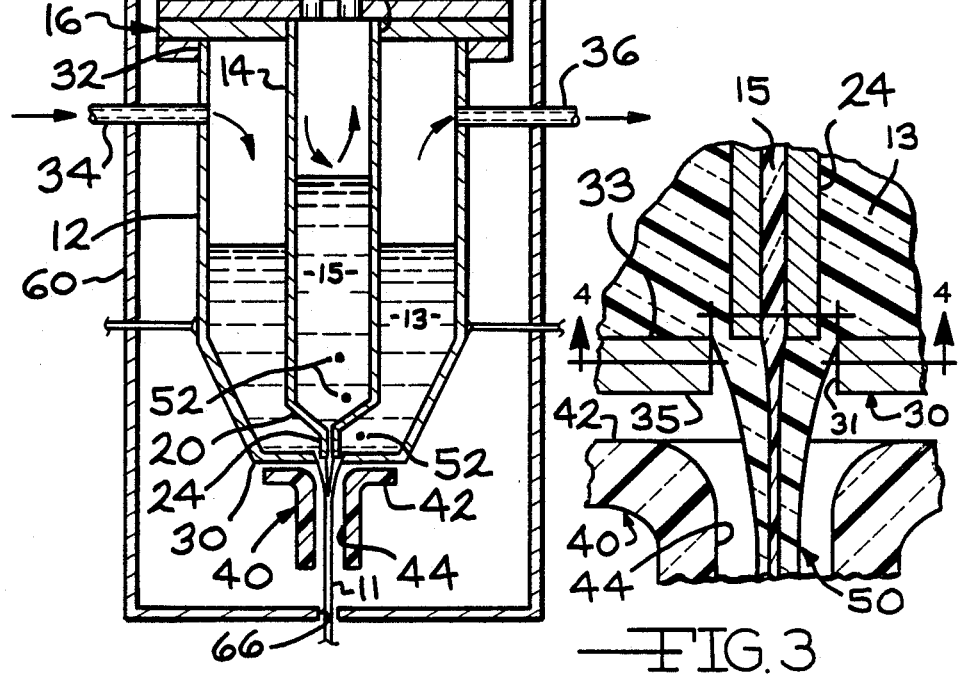
FIG. 2
FIG. 3

APPARATUS AND PROCESS FOR FIBERIZING FLUORIDE GLASSES USING A DOUBLE CRUCIBLE AND THE COMPOSITIONS PRODUCED THEREBY

BACKGROUND OF THE INVENTION

The invention pertains to a double crucible apparatus for making optical fibers containing fluoride glass, the process for making optical fluoride glasses, and the fluoride glass compositions produced thereby.

In one of its more specific aspects, this invention pertains to fluoride glasses which can be fiberized to produce continuous, defect-free optical fibers. Recently, there have been developed optical fibers which are especially useful in the area of data communication. The data is communicated as light in the near IR region along the optical fiber. A fluoride glass fiber is a particularly attractive candidate for waveguide optical cable systems and various types of transmission systems due to the fluoride glass fibers's ultralow scattering loss property.

Such fluoride glass optical fibers typically comprise an inner, or core, fluoride glass fiber coaxially within an outer, or clad, fluoride glass fiber, It is important that the "core/clad" fluoride glass fibers have certain desirable properties. One of these properties is that the core/clad fiber be capable of being formed in long continuous lengths. Also, it is important that the core/clad fluoride glass fibers have low attenuations or transmission losses in order to allow for the transmission of quality data communications. Further, the transmission of light along the glass fiber is a wave phenomena. Any defects in the glass fiber, such as crystals in the glasses, voids in the core glass or bubbles at the core/clad surface interface, cause scattering of the transmitted light thereby greatly diminishing the quality of the data transmissions.

One drawback in using fluoride glass fibers is that it has previously been difficult to form fluoride glass fibers having an adequate and useful length, while still maintaining the desired low scattering loss property which can be achieved when producing bulk fluoride glass.

A known method used in forming fluoride core/clad glass fibers is the preform process. In the perform process the core part of the fiber is formed by pouring a hot fluoride glass melt into a preformed clad fluoride glass pipe which has been manufactured beforehand. During this process, however, crystals and bubbles are sometimes produced at the core-clad interface, so that the effective length of the glass fiber is restricted. Furthermore, the inner diameter of the clad glass pipe is limited to that size which will allow core glass to be poured into it. The diameter of the clad glass pipe produced by this method is too large to be useful for the forming of single mode fibers.

Another method for forming core/clad fluoride glass fibers is known as the double crucible process wherein one crucible containing a core glass is located within another crucible containing a clad glass. The fibers are thus drawn from the double crucible. However, with respect to fluoride glasses, there are several drawbacks which previously have been associated with the double crucible method. In particular, the viscosity of the fluoride glass at which fibers can be formed lies below the fluoride glass's liquidus temperature. Consequently, crystals can form during the draw process. In order to minimize the growth of these crystals, fibers must be drawn at very high viscosities. However, in order to draw fluoride glass fibers at high viscosities, highly pressurized crucibles must be used in order to maintain the fluoride glass throughtput at a rate which will produce, without fracture and at sufficiently high draw speeds, crystal free optical fibers. However, there is a high viscosity limit at which the fluoride fibers can be drawn wherein the drawn fibers exhibit a circular cross section and are free from surface irregularities. Beyond this viscosity limit, fibers can be drawn but any nonuniformities which occur during the fiberizing process are frozen into the fiber. In addition, at high glass viscosities, the double crucible process previously tended to produce hollow fibers which is a manifestation of the glass's inability to flow sufficiently well to fill the void that is created as glass is removed from the bottom of the crucible during the fiberization process. Another drawback to the previously known double crucible process is that the core/clad fluoride glass fibers thus formed do not have a consistent fiber diameter, which is critical if such fluoride glass fibers are to be used for fiber optics.

The present invention is directed to a solution of these problems.

SUMMARY OF THE INVENTION

According to this invention there is provided a double crucible fiberizing apparatus and a process for forming core/clad fluoride glass fibers well below the liquidus temperature of the fluoride glasses. In addition, the present invention relates to the rapid fiberization of fluoride glasses in order to yield non-hollow, crystal free fibers. The process of the present invention reduces outer diameter fluctuations of the clad glasses to a tolerable level.

The double crucible fiberizing apparatus of the present invention comprises a double crucible located within an environmentally controlled chamber. The double crucible comprises an inner crucible located within an outer crucible. The outer crucible is heated by passing an electrical current through it. The inner and outer crucible define a concentric tip system through which the glasses flow. The concentric tip system comprises a tip which defines an aperture at the base of the inner crucible and an orifice plate at the base of the outer crucible which concentrically surrounds the tip. The double crucible fiberizing apparatus further includes a shield, such as a tube, which is coaxially positioned in a spaced apart relationship to the concentric tip system. The shield aids in reducing fluctuations in fiber diameter during the core/clad fiber formation process by preventing air currents from disturbing the drawn fiber.

In the process of the present invention the fluoride glasses in the inner and outer crucibles are heated to a temperature of about 750°–850° C. and held at that temperature for approximately 30 to 40 minutes to allow the glasses to cure. The temperatures of the glasses are then rapidly quenched by quenching the temperature of the clad glass in the outer crucible to about 250° C. and holding the temperature of the clad glass at a temperature of about 250° C. until the core glass reaches about 350° C. The outer crucible is then rapidly raised to a fiberizing temperature of about 314°–318° C. and fibers are drawn, depending upon the pressure level in the crucibles, at speeds of about 15 to 50 meters/min. This transient processing cycle, realized by controlling the electrical current flow to the outer crucible, allows the core and clad glasses to experience a thermal history that will minimize growth of crystals as the glass passes from the refining to the fiberizing condition. Furthermore, under these conditions, low pressures independently applied to each crucible, are effective in providing throughputs that allow non-hollow fibers to be drawn at speeds up to 55 meters per minute. Low pressures (less than about 10 psi) are adequate to generate 55 meter/min. drawing speeds. The fibers being drawn from the crucible pass through the shield beneath the double crucible. The drawn fibers exhibit clad diameter fluctuations with a standard deviation of about 0.7 to 0.9 microns.

The double crucible apparatus and process of the present invention are most useful in preventing the formation of crystals while fiberizing fluoride glasses since fluoride glasses must be fiberized below their liquidus temperature. This is especially important since the presence of crystals in the fiber greatly reduces the optical clarity of the fibers.

These and other aspects and advantages of the present invention will become more clear after careful consideration is given to the detailed description of the invention which follows.

BRIEF DESCRIPTION OF THE DRAWINGS

FIG. 1 is a plan view of a double crucible apparatus.

FIG. 2 is a side elevational view, partially in cross-section, of the double crucible apparatus of FIG. 1 in an environmentally controlled chamber.

FIG. 3 is an enlarged view of a concentric tip system of the double crucible apparatus of FIG. 2.

FIG. 4 is a view taken along the line 4—4 in FIG. 3.

DETAILED DESCRIPTION OF THE PREFERRED EMBODIMENT

Figure 5:
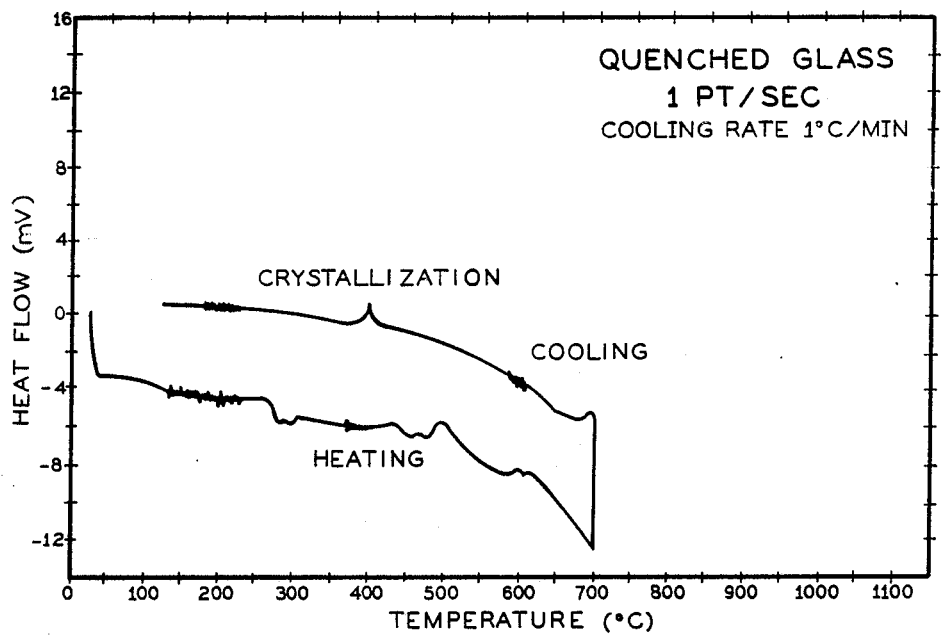
FIG. 5 is a graph showing the temperature at which crystallization occurs upon heating and cooling of a core/clad fluoride glass fiber.

As shown in FIGS. 1 and 2, a double crucible fiberizing apparatus 10 of the present invention is generally shown. The double crucible fiberizing apparatus 10 includes an outer crucible 12 and an inner crucible 14 positioned within the outer crucible 12. The outer crucible 12 is heated by passing an electrical current through it. In a preferred embodiment, the crucibles are generally made from noble metals or noble metal alloys.

Referring now in particular to FIG. 2, the inner crucible 14 generally includes a first or bottom end 20 and a second or upper end 22. The bottom end 20 includes a tip 24 which defines an aperture 25, through which glass flows during the fiber forming process. The upper end 22 includes a flange 16 which extends radially outwardly from the upper end 22 and sealingly engages an upper end 32 of the outer crucible 12. The upper end 22 is sealed with a lid 17. Gas passageways 26 and 28 extend through the lid 17 such that a refining gas is supplied through the passageways 26 and 28 to the inner crucible 14, as will be further explained below.

The outer crucible 12 generally includes a first end or orifice plate 30 and a second or upper end 32. The upper end 32 is sealingly engaged by the flange 16 such that the outer crucible 12 is sealed from the inner crucible 14. The orifice plate 30 has an upper surface 33 and a lower surface 35 and defines an orifice 31, as best seen in FIG. 4, through which glass flows during the fiber forming process. In a preferred embodiment, the orifice 31 concentrically surrounds the tip 24 of the inner crucible 14. Gas passageways 34 and 36 extend through the upper end 32 of the outer crucible 12 such that a refining gas is supplied through the passageways 34 and 36 to the outer crucible 12, as will be further explained below.

In a preferred operation, dryers (not shown) can be installed into the passageways 26 and 28, and 34 and 36, carrying the refining gas to the crucibles. The refining gas being circulated in the crucibles can be, for example, nitrogen, oxygen, argon or dry air.

Adjacent the orifice plate 30 of the outer crucible 12 is a shield 40. The shield 40 is in a spaced apart relationship to the lower surface 35 of the orifice plate 30 of the outer crucible 12. In a preferred embodiment the shield 40 is spaced approximately ⅛ inch from the lower surface 35 of the orifice plate 30. The shield 40 is preferrably cylindrically shaped and oriented wih the cylindrical axis extending vertically through the tip 24 of the inner crucible 14. The diameter of the shield 40 is greater than the daimeter of a forming glass fiber 50. The shield 40 has a first end 42 which extends radially outwardly from the shield 40. In a preferred embodiment, the first end 42 of the shield 40 is oriented substantially parallel to the orifice plate 30 of the outer crucible 12. The shield 40 defines a passageway 44 for the forming glass fiber 50.

Referring now to FIG. 3 in particular, the tip 24 of the inner crucible 14 and the orifice plate 30 of the outer crucible 12 are shown in greater detail. The tip 24 of the inner crucible 14 terminates at a point adjacent the upper surface 33 of the orifice plate 30 of the outer crucible 12. In a preferred embodiment the tip 24 terminates in approximately the same plane as the upper surface 33 of the orifice plate 30.

As can generally be seen in FIG. 2, the double crucible apparatus 10 is enclosed in an environmentally controlled chamber 60 having a gas inlet 62 and gas outlet 64. The chamber is supplied with a gas, such as nitrogen through the inlet 62. The gas pressure within the chamber 60 is kept slightly above atmospheric pressure such that any leaks in the chamber 60 would allow nitrogen to leak out from the chamber 60 rather than allowing atmospheric air from leaking into the chamber 60. The chamber 60 includes an opening 66 through which the core/clad fluoride glass fiber 50 is drawn. In a preferred embodiment, the distance between the orifice plate 30 and the opening 66 is such that the fiber solidifies in the presence of the nitrogen gas and before being exposed to the atmospheric air. The gas pressure in the chamber 60 prevents the gas from flowing through the orifice 31 in the orifice plate 30 and into the outer crucible 12.

A major distinction between fiberizing fluoride glasses versus silica glasses for use in optical applications and fiberizing glasses for use in textile processes is that fluoride glasses must be fiberized below the glass's liquidus temperature. The inherent viscosity characteristics of fluoride glass compositions places their fiberizing viscosity below the glass liquidus temperature. However, when the fluoride glasses are fiberized below their liquidus temperature, crystals generally appear within the glass and precipitate from the fluoride glass composition during the fiber drawing process. For the fabrication of fluoride glass optical fibers, this is a major concern since the crystals act as light scattering sites and degrade the optical performance of the fibers.

Further, since most currently used fluoride glass compositions require the use of sub-liquidus temperatures in the forming process, the success of fiberizing the fluoride glass compositions using a crucible method lies in discovering a process which will allow the fiber drawing parameters (such as, for example, winding speed, throughput, and temperature) to be adjusted to draw the fluoride glass fiber to the desired length before crystallization occurs in the fibers.

In the double crucible glass fluoride glass process of the present invention several interdependent factors are taken into consideration: (1) the final operating temperature allows fiberization to occur, and optional use of pressurizing the inner and outer crucibles, at low pressures, may be used to aid in the fiberizing; (2) the final operating temperature is in a region where crystal growth rates are slow enough to allow a fiber of adequate length and optical quality to be drawn (while still satisfying the above factor); and, (3) the temperature ranges that the fluoride glasses pass through before the actual drawing of the fibers occur at a rate that inhibits crystallization.

During the preferred process of making fluoride core/clad glass fibers, the inner crucible 14 is charged with a core glass composition 15 and the outer crucible 12 is charged with a clad glass composition 13 and the lid 17 is sealed onto the crucibles 14 and 12. The compositions in the crucibles 14 and 12 are heated to a temperature of approximately 750°-850° C. and the compositions 13 and 15 are then allowed to cure for 30 to 40 minutes. Subsequently, the clad glass composition 13 in the outer crucible 12 is rapidly quenched, at a rate of greater than 1° C. per minute, and held at a temperature of about 250° C. until the temperature of the core glass composition 15 reaches about 350° C. This quenching time takes about 3-5 minutes. The temperature of the clad glass composition 13 in the outer crucible 12 is then raised to a fiberizing temperature of about 314°-318° C. When the temperatures of the core glass composition 15 and clad glass composition 13 reach an equilibrium temperature of about 314° C., plugs (not shown) in the inner crucible 14 and in the outer crucible 12 are removed, the shield 40 is positioned beneath the orifice plate 30, and the core glass composition 15 and clad glass composition 13 are drawn into the core/clad fluoride glass fiber 50. If desired, the pressure of the inner crucible 14 is slightly raised and the gas pressure of the outer crucible 12 is slightly raised to about 1 to about 6 psi during the fiber drawing step. The application of low pressures of the refining gas to the inner and outer crucibles, 14 and 12 respectively, provides latitude in terms of the optimum final fiberizing conditions (i.e., viscosity and core/clad diameter ratios). In a preferred embodiment, dry air is used as the refining gas. The effect of the applied pressure on the crucibles' throughput at a constant fiber diameter is that with only low pressures of about less than 10 psi the throughput necessary to produce a kilometer of fiber in about 20 minutes is achieved.

According to a preferred process of the present invention the refining gas is fed into both the outer crucible 12 and the inner crucible 14. The refining gas flowing into each crucible may be supplied at different pressures. The gas pressure supplied to the inner crucible 14 is preferably between 2 to about 8-10 psi and the gas pressure supplied to the outer crucible 12 is preferably between 1 to about 6 psi. The different pressures in each crucible allow for the independent control of glass throughputs, and as a consequence, allows for more flexibility in achieving the desired core/clad diameter ratio for the optical fiber. The fiber is then drawn at speeds of about 15-50 meters per minute. The fiber being drawn passes through the passageway 44 in the shield 40. In one embodiment of the invention the core/clad fiber thus formed has a core glass diameter of about 40 microns and a clad glass diameter of about 150 microns. The presence of the shield 40 acts to keep any fluctuations in the core/clad fiber diameter below 1-3 microns by minimizing turbulent airflow around the forming fiber 50. In a preferred embodiment, the diameter of the tip 24 of the inner crucible 14 ranges from about 0.076 to about 0.098 inches and the diameter of the orifice 31 in the orifice plate 30 ranges from about 0.2 to about 0.25 inches.

Figure 6:
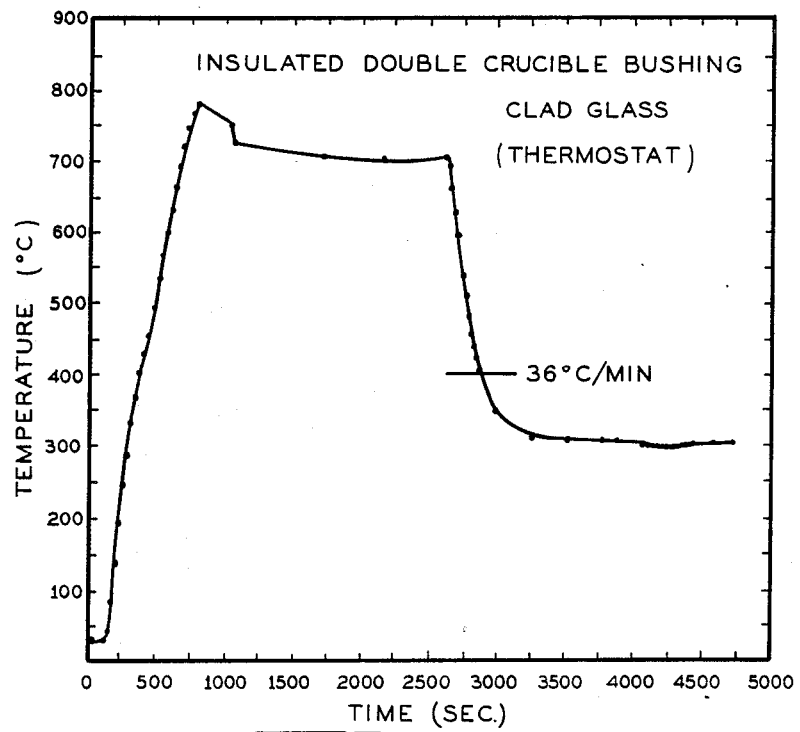
FIG. 6 is a graph showing the temperature response of the clad fluoride glass at the thermocouple location shown in the double crucible apparatus of FIG. 2.
Figure 7:
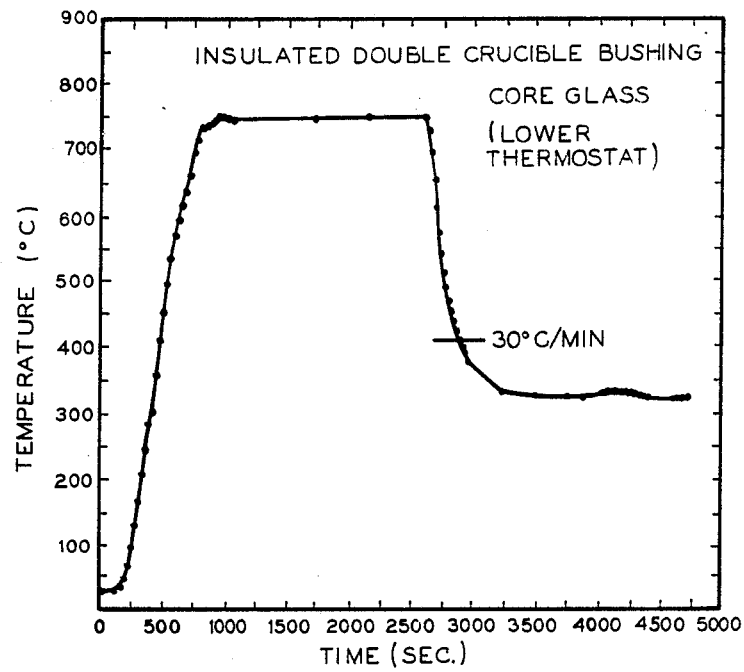
FIG. 7 is a graph showing the temperature response of the core fluoride glass at the lower thermocouple location shown in the double crucible apparatus of FIG. 2.
Figure 8:
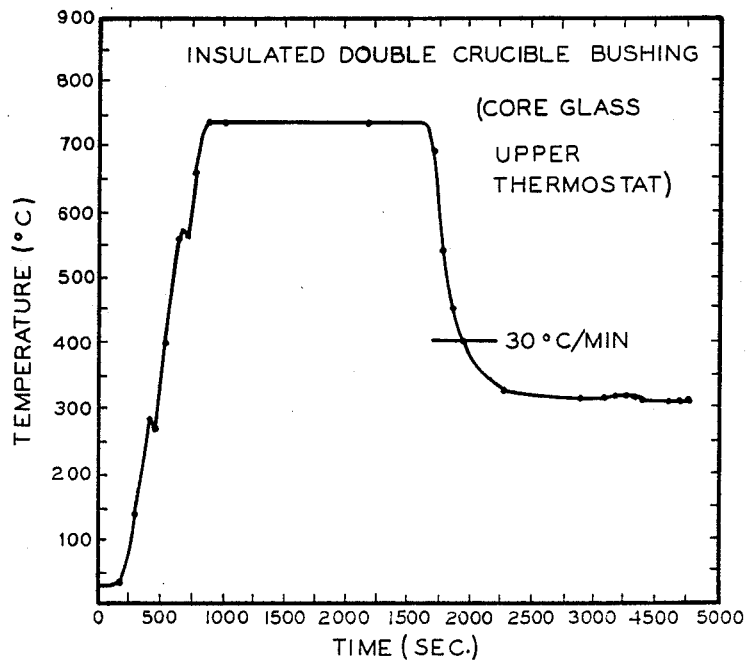
FIG. 8 is a graph showing the temperature response of the core fluoride glass at the upper thermocouple location shown in the double crucible apparatus of FIG. 2.

In quenching from the curing temperature to the fiberizing temperature, the fluoride glasses are quenched at a rate that suppresses crystallization. FIG. 5 shows the temperature at which crystallization occurs upon heating and cooling of a small sample of the fluoride glass to be fiberized. The lower curve represents heating from about 100° C. to 700° C. and the upper cruve represents the fiberization process (cooling from melt to fiberizing temperature) and shows that a small crystallization peak occurs at about 400° C. when the sample is cooled at a rate of 1° C. per minute. When the fluoride glasses are cooled at a rate greater than 1° C. per minute this crystallization peak is prevented. FIGS. 6, 7 and 8 show data that represents the temperature response of the fluoride glass in the double crucible apparatus 10 at the various thermocouple locations in the inner and outer crucibles. The slopes of these curves give the cooling rate at various times within the cooling cycle. For the three thermocouple locations 52 shown in FIG. 2, the cooling rates calculated were 36° (FIG. 6), 30° (FIG. 7) and 30° (FIG. 8) centigrade/minute. These cooling rates are significantly greater than the required 1° centigrade/minute.

The data in Table 1 below shows the core and clad diameter of several spools of fiber drawn using the double crucible apparatus and process described herein. These fiber parameters are representative of multimode fibers and are indicative of the diameter control achievable using the fiber forming processes of the present invention.

TABLE 1

| Spool | Core Diameter Microns | Clad Diameter Microns | Clad Diameter Variation +/− Sigma (microns) |
|---|---|---|---|
| 1 | 75.13 | 140.3 | .7 |
| 2 | 42.14 | 145.3 | .7 |
| 3 | 51.9 | 149.0 | .7 |

The data in Table 2 below shows the core and clad diameter of spools of fiber drawn using the same double crucible apparatus and method and demonstrates the ability to draw small core or single mode fibers.

TABLE 2

| Spool | Core Diameter Microns | Clad Diameter Microns | Clad Diameter Variation +/− Sigma (microns) |
|---|---|---|---|
| 1 | 17.0 | 145 | .9 |
| 2 | 14.3 | 145 | .9 |
| 3 | 8.4 | 140 | .9 |

In one embodiment the fiberizing operating parameters are as follows:
Outer crucible orifice diameter—0.210 inches
Inner crucible tip diameter—0.088 inches
Linear draw speeds—20 meters/min.
Draw temperature—314°–318° C.
Crucible environment—dry air
Refining temperature—700° C.
Refining time—30 minutes
Outer crucible charge—70 grams
Inner crucible charge—10 grams
Clad pressure—2 psi
Core pressure—6 psi In a preferred embodiment, the composition of the glasses is as follows:

| CORE | CLAD |
|---|---|
| $ZrF_4$ - 53% (Mole %) | $ZrF_4$ - 39.7% (Mole %) |
| $BaF_2$ - 20% | $BaF_2$ - 18.0% |
| NaF - 20% | NaF - 22.0% |
| $LaF_3$ - 4% | $LaF_3$ - 4.0% |
| $AlF_3$ - 3% | $AlF_3$ - 3.0% |
|  | $HfF_3$ - 13.3% |

The refractive index of the above described glass is clad 1.4955, core 1.5038, N.A.=0.158.

In a continuing series of tests, over 50 spools of fiber were drawn from the double crucible apparatus. Fiber lengths on these spools varied between 60 and 100 meters and fiber diameters were 40 to 50 microns core and 140 to 150 microns clad.

The scattering losses of these fibers as measured at 0.632 microns (He-Ne wavelength) varied between 10 to 500 db/km. The fiber with the lowest scattering loss yield a total loss of 30 db/km.

The best fibers with respect to diameter stability are fibers whose statistical distributions are nearly Gaussian with a standard deviation of about 0.9 microns. The diameter fluctuations tend to be short term in nature and correspond to fiber lengths of approximately 4 cm.

It is apparent that, within the scope of the present invention, modifications and different arrangements and operating parameters can be made other than as herein disclosed. The present disclosure is merely illustrative with the invention comprehending all variations thereof.

I claim:

1. An apparatus for producing a continuous glass fiber having a core fluoride-containing glass concentrically surrounded by a clad fluoride-containing glass, comprising:
    an outer crucible for melting the clad glass, the outer crucible comprising an upper end and an orifice plate defining an orifice for supplying a stream of molten clad glass;
    an inner crucible for melting the core glass, the inner crucible positioned within the outer crucible, the inner crucible comprising an upper end and a bottom end, the bottom end comprising a tip defining at least one aperture for supplying a stream of molten core glass, the tip being oriented substantially concentric with the orifice in the orifice plate of the outer crucible; and,
    a shield in a position to limit turbulent gas flow immediately adjacent the forming continuous glass fiber in a zone beneath the orifice plate of the outer crucible, the shield defining a passageway coaxial with the aperture in the tip of the inner crucible.

2. The apparatus of claim 1, wherein the tip of the inner crucible has a bottom surface and the orifice plate of the outer crucible has an upper surface and a lower surface, the bottom surface of the tip terminating in a common plane with the upper surface of the orifice plate.

3. The apparatus of claim 2, wherein the shield defines a first end adjacent the orifice plate, the first end of the shield extending radially outward from the passageway defined in the shield, the first end of the shield being oriented substantially parallel to the orifice plate of the outer crucible.

4. The apparatus of claim 3, wherein the shield is in a spaced apart relationship, of approximately ⅛", to the bottom surface of the orifice plate of the outer crucible.

5. The apparatus of claim 1, wherein the outer crucible, the inner crucible and the shield are enclosed in a chamber having a gas inlet passageway and a gas outlet passageway, the chamber including an opening in a spaced apart relationship to the shield such that the forming continuous fiber is drawn through the opening in the chamber.

6. The apparatus of claim 1, wherein the inner crucible includes a flange extending radially outward from the upper end of the inner crucible toward the outer crucible whereby the outer crucible is sealed with the inner crucible flange.

7. The apparatus of claim 1, wherein the upper end of the inner crucible is sealed with a lid.

8. The apparatus of claim 1, wherein the outer crucible further includes at least one glas inlet passageway and at least one gas outlet passageway, the outer crucible being adapted to receive a supply of a gaseous material.

9. The apparatus of claim 1, wherein the inner crucible further includes at least one gas inlet passageway and at least one gas outlet passageway, the inner crucible being adapted to receive a supply of a gaseous material.

10. A process for producing a continuous glass fiber having a core fluoride-containing glass concentrically surrounded by a clad fluoride-containing glass comprising:
    heating a supply of molten core glass in an inner crucible and heating a supply of molten clad glass in an outer crucible;
    allowing the molten core glass and the molten clad glass to cure;
    quenching the temperature of the molten core glass and molten clad glass;
    raising the temperature of the molten core glass and the molten clad glass to a fiberizing temperature;
    supplying a stream of molten core glass from the inner crubicle concentrically surrounded by a stream of molten clad glass from the outer crucible;
    drawing the stream of molten core glass concentrically surrounded by the stream of molten clad glass into the continuous glass fiber through a shield in a position to limit turbulent gas flow in a zone beneath the outer crucible.

11. The process of claim 10 in which the molten core glass and molten clad glass are heated to approximately 750°–850° C.

12. The process of claim 10 in which the molten core glass and molten clad glass are allowed to cure for approximately 30 to about 40 minutes.

13. The process of claim 10 in which the molten core glass and the molten clad glass are quenched at a rate of greater than about 1° per minute.

14. The process of claim 13 in which the temperatures of the molten core glass and molten clad glass are quenched by quenching the temperature of the molten clad glass to about 250° C. and holding the temperature of the molten clad glass at the 250° C. temperature until the temperature of the molten core glass reaches about 350° C.

15. The process of claim 10 in which the fiberizing temperature of the molten clad glass is in the range of about 314°–318° C.

16. The process of claim 10 in which the stream of molten core glass concentrically surrounded by the stream of molten clad glass is drawn at about 15 to about 50 meters per minute.

17. The process of claim 11 in which the molten core glass is held in the inner crucible under pressure at about 2 to about 8–10 psi and the molten clad glass is held in the outer crucible under pressure at about 1 to about 6 psi during the drawing step.

18. The process of claim 17 in which the molten core glass is held in the inner crucible under about 2 to about 8–10 psi pressure of dry air and the molten clad glass is held in the outer crucible under about 1 to about 6 psi pressure of dry air.

19. The process of claim 10 in which the stream of molten core glass concentrically surrounded by the stream of molten clad glass is drawn in a pressurized environment greater than atmospheric pressure.

20. The method of claim 19 in which the pressurized environment comprises nitrogen.

* * * * *